United States Patent
Zhou et al.

[19]

[11] Patent Number: 5,982,513
[45] Date of Patent: Nov. 9, 1999

[54] METHOD AND SYSTEM TO ALIGN HOLOGRAPHIC IMAGES

[75] Inventors: Gan Zhou, Altadena; Demetri Psaltis, Pasadena; Fai Mok, West Hills; Allen Pu, Pasadena, all of Calif.

[73] Assignee: Holoplex, Inc., Pasadena, Calif.

[21] Appl. No.: 09/020,469

[22] Filed: Feb. 9, 1998

[51] Int. Cl.$^6$ .................................................. G03H 1/26
[52] U.S. Cl. ....................... 359/22; 359/25; 369/44.11; 369/44.19; 250/201.5
[58] Field of Search ............................. 359/15, 22, 24, 359/25; 369/44.11, 44.19; 250/201.5, 557

[56] References Cited

U.S. PATENT DOCUMENTS

| | | | |
|---|---|---|---|
| 3,767,285 | 10/1973 | Mezrich | 359/25 |
| 4,278,318 | 7/1981 | Nakayama et al. | 359/25 |
| 5,566,387 | 10/1996 | Dewald | 359/3 |

FOREIGN PATENT DOCUMENTS

| | | | |
|---|---|---|---|
| 52-67650 | 6/1977 | Japan | 359/25 |
| 54-39651 | 3/1979 | Japan | 359/25 |

OTHER PUBLICATIONS

English translation of Japanese Patent Fujito, No. 52–67650, dated Jun. 1977.
English translation of Japanese Patent Nakayama, No. 54–39651, dated Mar. 1979.

Primary Examiner—Cassandra Spyrou
Assistant Examiner—Darren E. Schuberg
Attorney, Agent, or Firm—Fliesler Dubb Meyer & Lovejoy, LLP

[57] ABSTRACT

A method and a system to re-align onto a detector array a holographic image of a Fourier region hologram stored in a medium, with the medium spinning around a first axis, and the hologram being generated by a reference beam and a signal beam. In generating the hologram, the reference beam is incident on the medium with respect to a second axis at a second-axis-incident angle, and a third axis at a third-axis-incident angle, such that the holographic image of the hologram when reproduced by the reference beam is aligned onto the detector array. Also, the three axes are substantially orthogonal to each other. As the medium spins, the medium's orientation can change through tilting with respect to the second and the third axes so that the holographic image when reproduced by the reference beam is not aligned onto the detector array. In one embodiment, the holographic image is re-aligned onto the detector array by tilting the reference beam such that when re-aligned, the incident angle of the reference beam on the medium with respect to the second axis is intentionally tilted to be different from the second-axis-incident angle, and with respect to the third axis to be different from the third-axis-incident angle.

18 Claims, 8 Drawing Sheets

METHOD AND SYSTEM TO ALIGN HOLOGRAPHIC IMAGES

BACKGROUND OF THE INVENTION

The present invention relates generally to holography and more particularly to aligning holographic images of Fourier region holograms.

Holograms store information based on the concept of a signal beam interfering with a reference beam at a holographic medium, which stores the interference pattern as a hologram. The signal beam may be reconstructed to generate the image of the hologram by illuminating the hologram with the reference beam at the same incident angle that the hologram was created.

One approach to store holograms is to record them on a disk, such as radially or spirally, as in typical compact disks. When the disk spins, many holograms can be stored on the disk. One can increase storage capacity through multiplexing. For example, each spot on the spiral track can store a number of holograms by steering the reference beam to different incident angles to illuminate that spot.

During readout, the disk, illuminated by the reference beam, can spin continuously. The signal beams re-generated are focused to get the holographic images, which are typically measured by a detector array.

When holographic images are read from the spinning disk, they could be defocused, shifted, rotated or distorted. These may be due to disk wobbling, disk decentration from its rotation axis, or deformation of the disk substrate. Such defects may degrade or introduce error to the signals measured by the detectors.

Unlike typical compact disk where every image consists of one pixel, in holographic storage, every image can include hundreds of thousands of pixels. It is not uncommon to have an array with hundreds of thousands of detector elements just to measure one hologram. All of the pixels, not only for one hologram, but for every hologram on the disk, should be in focus, and located at correct positions relative to the detector array. Correct alignment for so many pixels in the holograms is not an easy task.

One way to reduce the alignment problem is to oversample the readout image. This can be done by using a detector array with many more detector elements than there are pixels in the holographic image. Then, based on error-correction codes, post processing may be able to re-create a defect-free image. However, this approach may not be able to solve de-focusing problem. Also, over-sampling requires a higher clock speed to retrieve data from the detector array. One way to operate at a slower clock rate is through parallelism. However, parallelism increases the size and the cost of the detector array. And sophisticated post processing may introduce extra bottleneck to the system's operating speed.

One approach to reduce cost and increase operating speed is to have a detector array whose pixels are one-to-one matched to the pixels of each holographic image. However, in order to be pixel matched for all the holograms, the holographic medium's mechanical position and orientation should be detected, with errors corrected.

As the disk spins, there are three degrees of freedom translationally, and three degrees of freedom rotationally. Relative to the detector array, during readout, the holograms may be shifted laterally, have changed its elevation, or tilted rotationally. Such mechanical position errors can be due to the disk being removable and the holder of the disk having limited precision. Removing the disk from and replacing it back into the holder may lead to alignment changes. Also, the disk is not perfectly flat, and is malleable. For instance, the manufacturing tolerance on bending in conventional CD-ROM disks is about 1.2 degrees. Thus, mis-aligning the holographic images to the detector array, and losing data in the images can easily occur.

It should have been apparent from the foregoing that there is still a need for methods and apparatus to properly track the disk to maintain alignment between the holographic images and the detector array, and to correctly read holographic images from holograms stored in disk format without introducing significant cost and bottleneck to the system.

SUMMARY OF THE INVENTION

The present invention provides methods and apparatus to re-align the image from a Fourier region hologram stored in a medium onto a detector array. The present invention accurately achieves pixel-to-pixel alignment, even if the medium shifts three-dimensionally, tilts in two axes and spins in the third.

First, in terms of the translational shift in three-dimensions, since the holograms are Fourier region holograms, a translational position error introduces a shift in the phase of a plane wave, which does not affect power detection by the detector array. For the three rotational errors, with the disk spinning, the detector array just has to wait for the right time to capture the image, and this will eliminate one rotational error. For other rotational or tilt errors, they can be significantly removed by tilting the reference beam. However, the tilt of the reference beam does not follow the tilt of the holograms. Actually, the tilt is in a direction that opposes the tilt of the hologram.

In one embodiment, the medium spins around a first axis, with holograms generated by the interference of a reference beam and a signal beam. In generating the hologram, the reference beam is incident on the medium with respect to a second axis at a second-axis-incident angle, and a third axis at a third-axis-incident angle, such that the holographic image of the hologram when reproduced by the reference beam is aligned onto the detector array. The three axes are substantially orthogonal to each other.

As the medium spins, the medium's orientation may be tilted with respect to the second and the third axes so that the holographic image when reproduced by the reference beam is not aligned onto the detector array. In one embodiment, the holographic image is re-aligned onto the detector array by tilting the reference beam such that when re-aligned, the incident angle of the reference beam on the medium with respect to the second axis is intentionally tilted to be different from the second-axis-incident angle, and with respect to the third axis to be different from the third-axis-incident angle.

Note that the language used in the specification has been principally selected for readability and instructional purposes, and may not have been selected to delineate or circumscribe the inventive subject matter. Also, the features and advantages described in the specification are not all-inclusive. Other aspects and advantages of the present invention will become apparent to one of ordinary skill in the art, in view of the specification, which illustrates by way of example the principles of the invention.

BRIEF DESCRIPTIONS OF THE FIGURES

Same numerals in FIGS. 1–8 are assigned to similar elements in all the figures. Embodiments of the invention are discussed below with reference to FIGS. 1–8. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
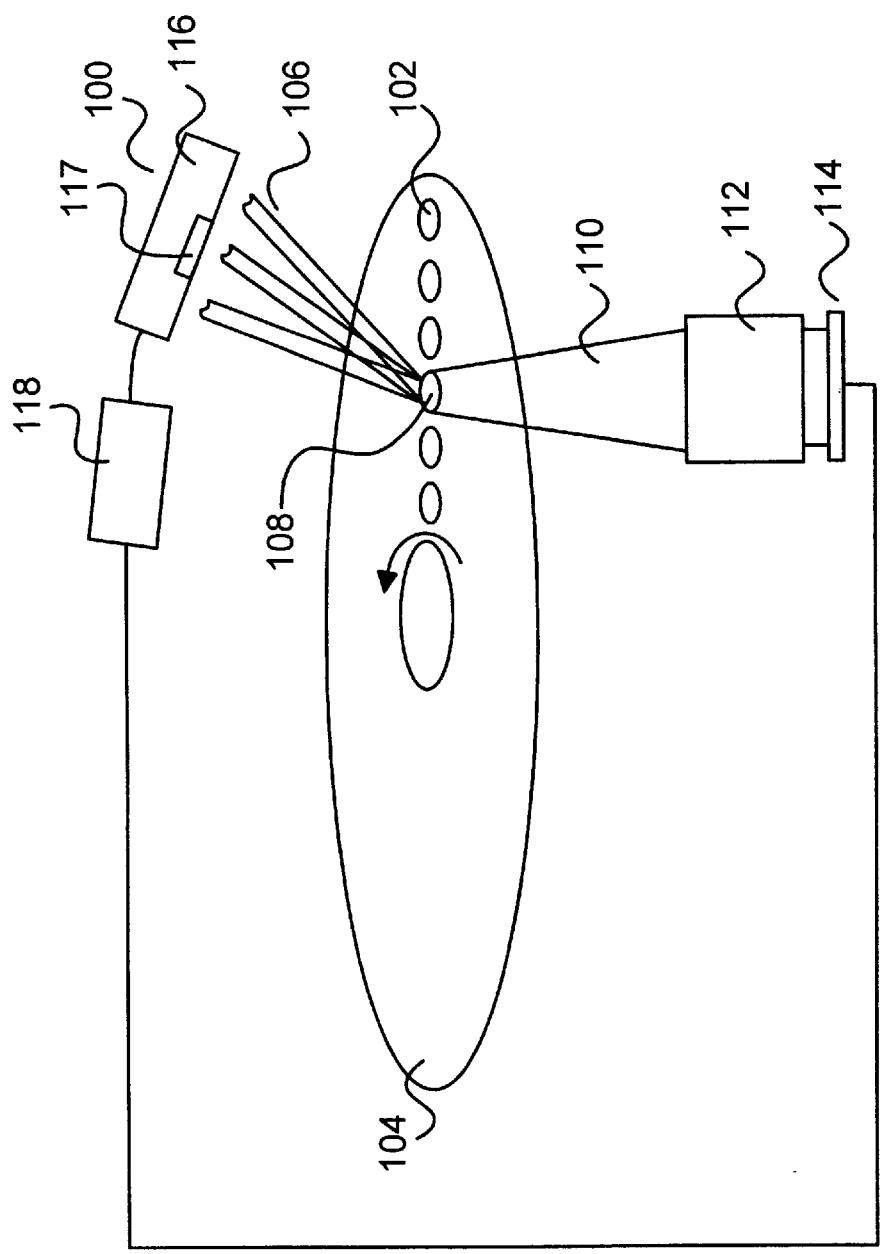
FIG. 1 shows one embodiment of reading holographic images from a disk in the present invention.

FIG. 1 shows one embodiment 100 of reading holographic images from a disk 104 in the present invention. The holograms were previously stored in the disk through the interference of a reference beam and a signal beam. Each area, such as 102, can have a number of holograms, stored through multiplexing. One approach to read a hologram is to illuminate an area with holograms by the reference beam at the same angle of incidence as the hologram was created. For example, the reference beam 106 illuminating the area 108 reconstructs the original signal beam 110, which is focused by an optical system 112 to form a holographic image to be received by a detector array 114. Each area can store many holograms through multiplexing. A detailed description of such multiplexing techniques to store and to reconstruct holographic images can be found in "Holographic Memories," written by D. Psaltis and F. Mok, published in Scientific American, V. 273 (5), pp 70–76 (1995). Such techniques will not be further described in this application.

The disk can be separated into many such areas with holograms. In one embodiment, the areas are arranged radially; and in another embodiment, the areas are arranged spirally. As the disk spins, holograms can be stored and read with the reference beam illuminating at appropriate incident angles. The incident angle can be controlled by a motion controller 116 manipulating the position of a beam scanner 117. In one embodiment, the motion controller 116 is connected to a servomechanism 118, which receives outputs from the detector array 114 as feedback signals.

Figure 2:
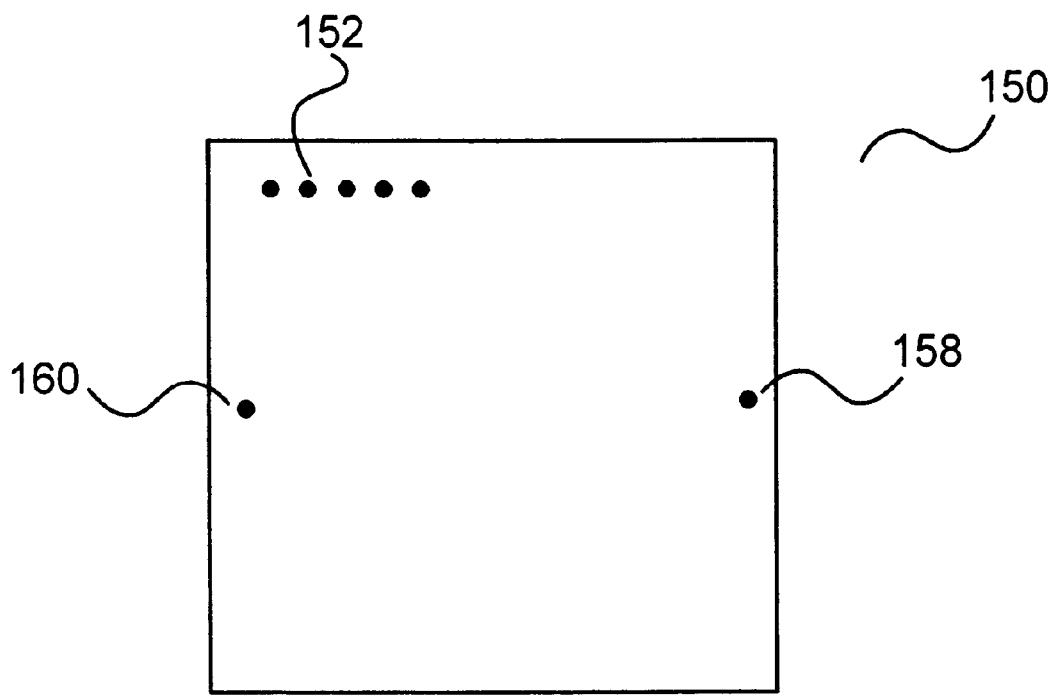
FIG. 2 shows one embodiment of a holographic image in the present invention.
Figure 3:
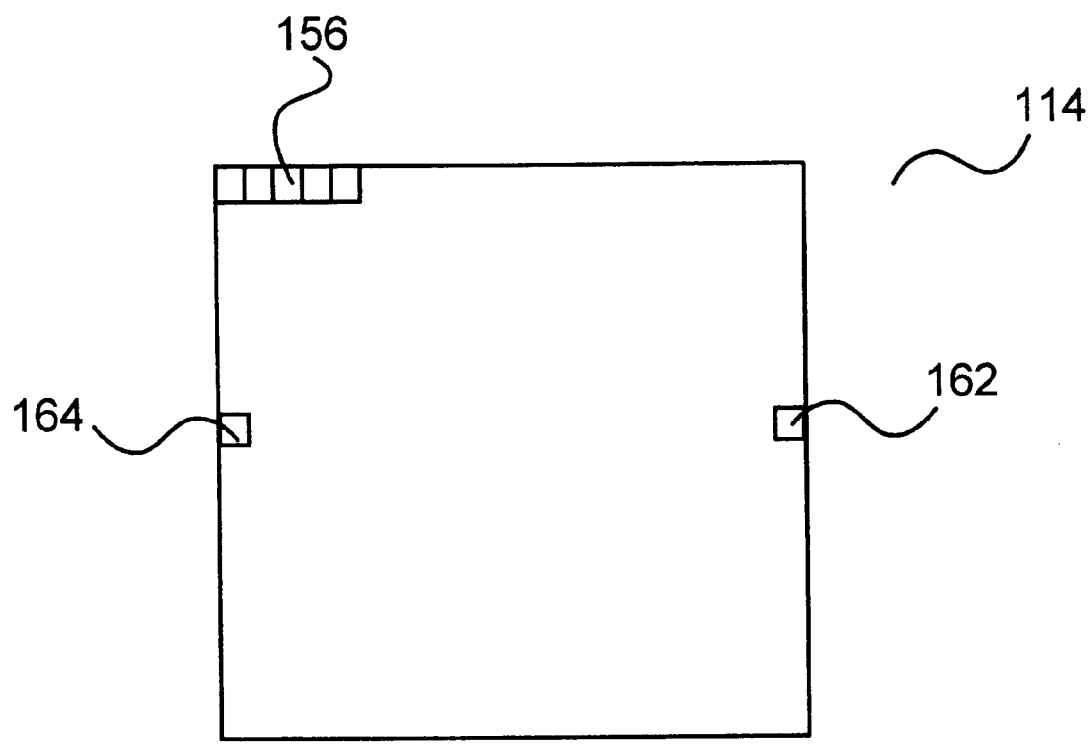
FIG. 3 shows one embodiment of a detector array for capturing a holographic image in the present invention.

FIG. 2 shows one embodiment of a holographic image 150 in the present invention, with numerous pixels, such as 152. FIG. 3 shows one embodiment of the detector array 114 for capturing a holographic image in the present invention. The detector array 114 includes numerous detector elements, such as 156. The detector elements can be charge-coupled devices, or other types of elements, such as photodiodes or phototransistors.

In one embodiment, each image includes two tracking pixels, 158 and 160, that are not part of the main image. These pixels are for alignment purposes, as will be explained later. The detector array 114 also includes two tracking detectors, 162 and 164. Each tracking detector can be a quadrant detector for alignment purposes, again will be explained later.

Figure 4:
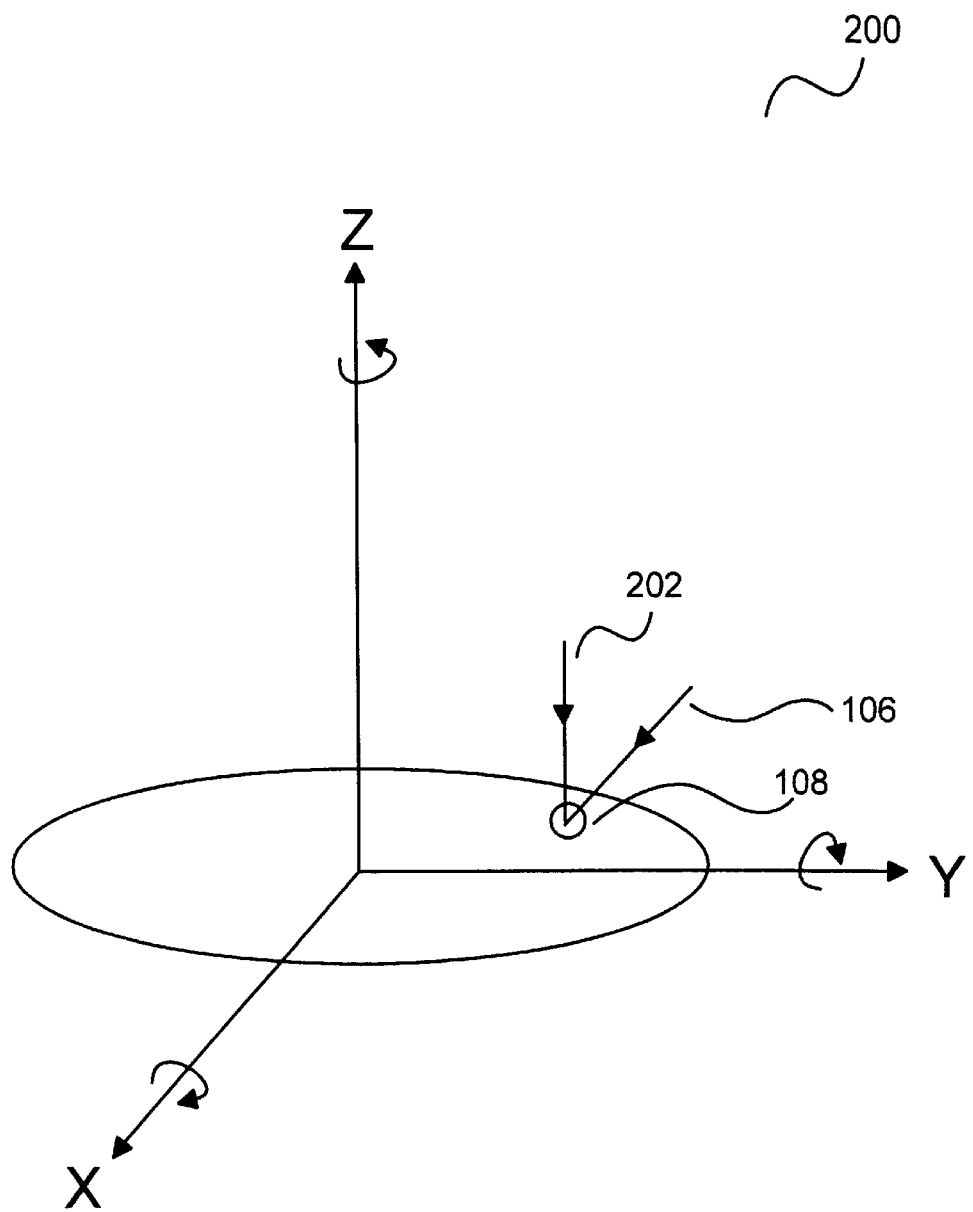
FIG. 4 shows a holographic disk coordinate system in the present invention.
Figure 5:
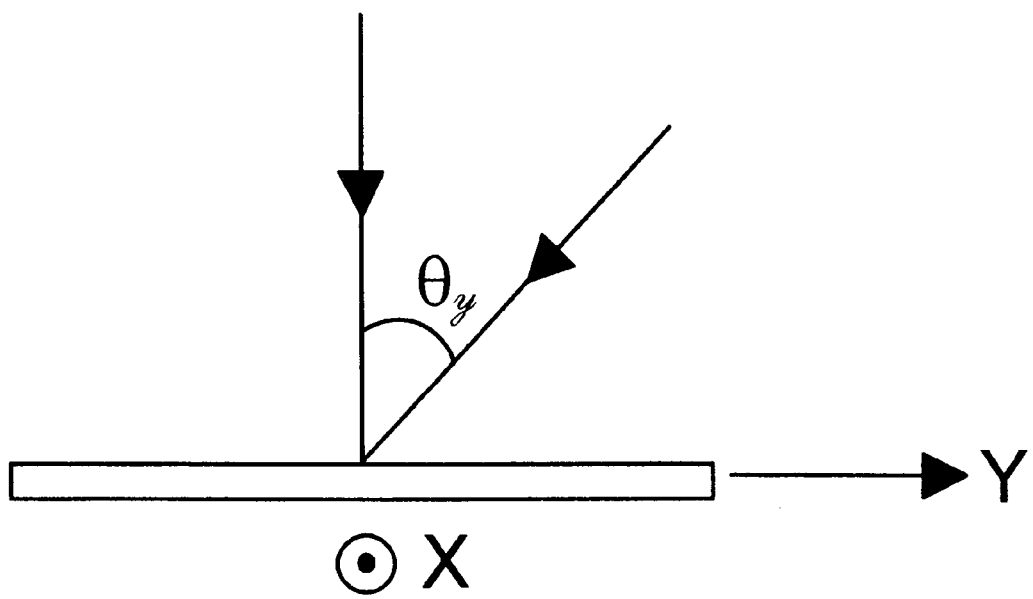
FIG. 5 shows the recording of a hologram as illustrated in the Y-Z plane in the present invention.
Figure 6:
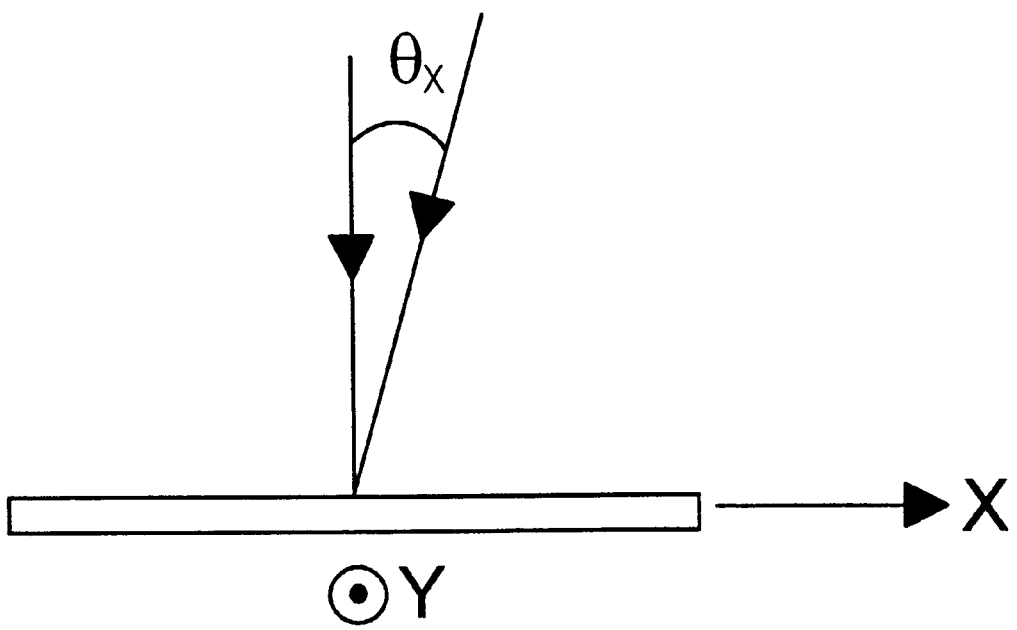
FIG. 6 shows the recording of a hologram as illustrated in the X-Z plane in the present invention.

FIG. 4 shows a holographic disk coordinate system 200 in the present invention. Typically, the disk controlled by a spindle motor spins around the Z-axis. The figure also shows the reference beam 106 and a signal beam 202 illuminating an area 108 to create a hologram. The reference beam is incident on the medium or the disk with respect to Y-axis at a Y-axis-incident angle, $\theta_y$, as shown in FIG. 5, and with respect to the X-axis at a X-axis-incident angle, $\theta_x$, as shown in FIG. 6. With such incident angles, without mis-alignment errors, the holographic image of the hologram when reproduced by the reference beam will be aligned onto the detector array 114. The three axes, X Y and Z, are substantially orthogonal to each other. In one embodiment, substantially orthogonal can be defined as between 80 and 100 degrees.

As the disk spins, the disk's orientation and position may change. Then when a holographic image is reproduced from a hologram, the relative position between the reference beam and the hologram changes from the position that the hologram was recorded, and the holographic image when reproduced by the reference beam will not be aligned onto the detector array 114.

There can be six sources of mechanical errors in the disk, the three translational positional errors in the X, Y and Z direction, and the three rotational positional errors about the X, Y and Z axes. These errors can lead to different types of optical errors in the holographic images read from the disk. Such optical errors are collectively referred to as alignment errors.

In one embodiment, the holograms are Fourier plane holograms, with the reference beam being plane waves. In another embodiment, the holograms are Fourier region holograms, with the reference beam again being plane waves. Such Fourier region holograms can be defined as holograms recorded in a plane after the Fourier transform lens, which is located at one focal length away from the object plane. These types of Fourier holograms are also discussed, for example, in "High-Density Recording in Photopolymer-Based Holographic Three-Dimensional Disks," written by A. Pu and D. Psaltis, published in Applied Optics, V. 35 (14), pp. 2389–2398 (1996). In such embodiments, the holographic image incident on the detector array 114 is insensitive to small amount of shifts in all three of the translational directions. This is because in the Fourier plane or region, each pixel in the object plane is represented by a plane wave. A small translational position error of the disk introduces a shift in the plane wave position, but not in the direction of propagation of the plane wave. The position of the image remains substantially the same after the reconstructed plane waves are focused onto the detector array 114. However, if the amount of translational change becomes too large, there might be image distortions due to the increased use of the edge of imaging lens in the optical system 112. As an illustration, the area 102 with holograms is 1 mm in diameter. The image distortion is not significant if the translational shift is not more than ±0.05 mm in all three translational directions. In one embodiment, the disk is positioned to within 0.05 mm in precision in all three translational directions. One skilled in the art should be able to achieve such precision with position encoders and actuators and the technique to do so will not be further described.

In terms of rotational or tilt error, the rotational error about the Z-axis, in one embodiment, is of no concern because one can always wait for the right time before capturing signals from the disk spinning about the Z-axis. So, time compensates for the error in the Z-axis. For the tilt errors about the X and the Y axes, if the disk tilts by an angle that is comparable to the Bragg-selectivity value, which is a function of the thickness of the disk, the holographic image read out is weakened in intensity due to the angular selectivity of thick holograms. For example, for a material thickness of 100 microns, the Bragg angle is about 1 degree. Based on good quality spindle motor, which is the motor spinning the disk, and good quality disk holder, and using glass as the substrate material for the disk, the tilt or rotational orientation can be maintained to within ±0.1 degree. This is satisfactory for purposes of Bragg-matching. However, a 0.1 degree tilt can cause the holographic image to shift by more than 1 pixel relative to the detector array. To avoid pixel registration error, in one embodiment, the image read out should be aligned to the detector array 114 to a precision of less than 1 pixel.

Figure 7:
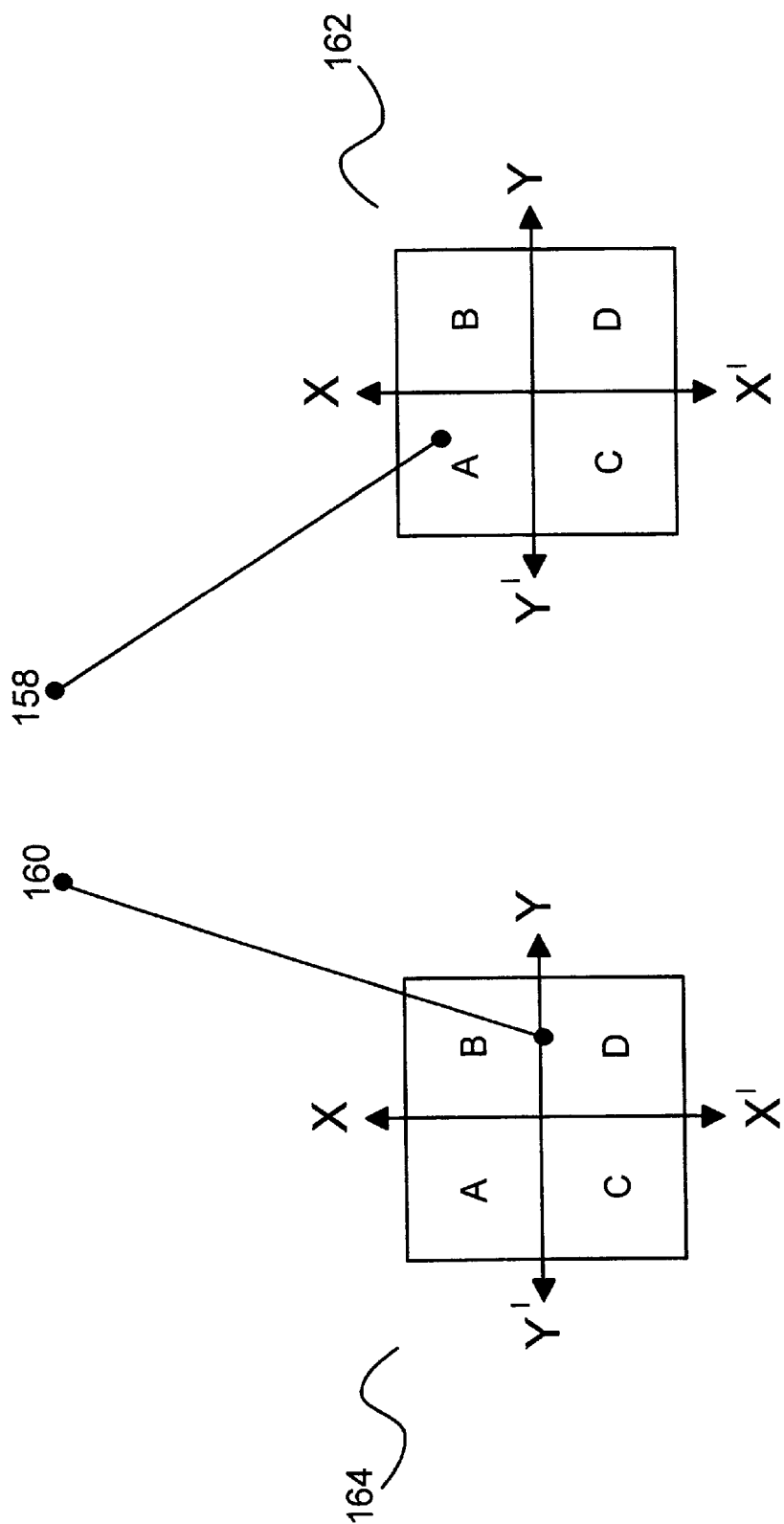
FIG. 7 shows two quadrant detectors for alignment in the present invention.

Before one can align the holographic image, one has to know the existing alignment errors. FIG. 7 shows one approach using two quadrant detectors, 162 and 164, to detect the position of the holographic image for alignment. As discussed earlier, in one embodiment, each hologram includes two tracking pixels, 158 and 160, and the detector array includes two tracking detectors, which can be quadrant detectors, 162 and 164. If correctly aligned, the image of each tracking pixel should fall in the center of the corresponding quadrant detector element.

As the disk spins, the tracking pixels can sweep across the quadrant detector surfaces in a direction substantially along the xx' axis, as shown in FIG. 7. Two error signals can be derived from each quadrant detector element by summation and subtraction as follows:

$$Ex1=(A+B)-(C+D);$$

and $$Ey1=(A+C)-(B+D);$$

where

A, B, C and D represent signals from each of the quadrant of a detector, as shown in FIG. 7;

Ex1 and Ey1 represent error signals from one of the quadrant detectors; and

Ex2 and Ey2 represent error signals from the other quadrant detector.

The disk tilt error can be obtained by monitoring the Ex1 signal from one quadrant detector continuously, and sample the Ex2, Ey1 and Ey2 when Ex1 is null. In other words, the error signals are sampled when the image of one of the tracking pixels crosses the line YY' of one of the quadrant detectors, as shown in FIG. 7. A nonzero Ex2 indicates a disk tilt around Y-axis or image shift along the X axis, and a nonzero Ey1 or Ey2 indicates a disk tilt around the X axis.

Figure 8:
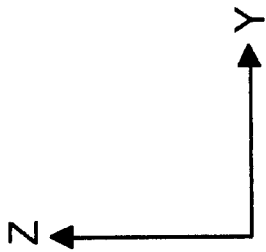
FIG. 8 depicts a K-space diagram illustrating the tilt to correct mis-alignment in the present invention.
Figure 8:
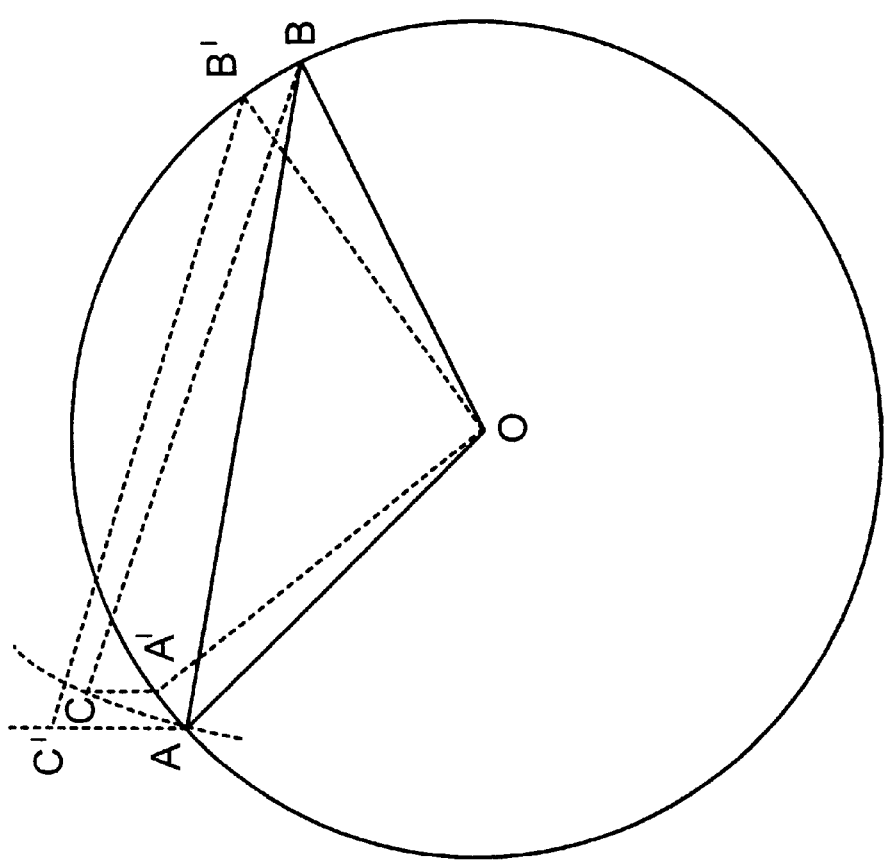

In one embodiment, to compensate for disk tilt, the incidence angles of the reference beam are modified in a way such that the incident angles are intentionally tilted to be different from their original incident angles, as better illustrated in FIG. 8.

FIG. 8 depicts a K-space diagram illustrating the tilt around the X-axis to correct mis-alignment of a hologram. The original incident angles of the reference beam and signal beam that created the hologram are along directions OB and OA, as shown in the figure. Disk tilt causes a grating tilt from AB to CB, and the reconstructed signal beam emerges along direction OA' which indicates a shift along Y axis of the readout image. By changing the reference beam angle from OB to OB', the reconstructed signal beam is steered from OA' back to OA, the original direction of the signal beam. Note that in the above compensation process, the reference beam does not simply follow the disk tilt to maintain the same relative angle with the disk. The reference beam actually changes its angle of incidence relative to the disk surface, so as to drive the shifted image back to alignment with the detector array. The tradeoff is a slight decrease in diffraction efficiency. The disk tilt around the Y-axis can be compensated by the same technique, except that the motion controller 116 steers the beam direction in the XZ plane.

The described tilting of the reference beam can be achieved by the servomechanism 118. In one embodiment, the tilting is done repeatedly in an incremental manner, with the alignment improving gradually. Once correct alignment is achieved, the system can maintain alignment until the servomechanism is disengaged. This process can be fast, with response time such as in a millisecond. This can be achieved by the mechanical controller 116 having sufficiently fast response time to control the beam scanner.

In another embodiment, the reference beam is a spherical wave.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A method of re-aligning onto a detector array a holographic image of a Fourier region hologram stored in a medium, the medium spinning around a first axis, the hologram being generated by a reference beam and a signal beam, in generating the hologram, the reference beam being incident on the medium with respect to a second axis at a second-axis-incident angle, such that the holographic image of the hologram when reproduced by the reference beam is aligned onto the detector array, the two axes being substantially orthogonal to each other, and the medium's orientation being modified through rotation with respect to the second axis so that the holographic image when reproduced by the reference beam is not aligned onto the detector array, the method of re-aligning the holographic image onto the detector array comprising the step of tilting the reference beam to re-align the holographic image onto the detector array such that when re-aligned, the incident angle of the reference beam on the medium with respect to the second axis is intentionally tilted to be different from the second-axis-incident angle.

2. A method as recited in claim 1 wherein:

in generating the hologram, the reference beam is incident on the medium with respect to a third axis at a third-axis-incident angle, such that the holographic image of the hologram when reproduced by the reference beam is aligned onto the detector array, the three axes are substantially orthogonal to each other, the medium's orientation has been modified through rotation with respect to the third axis, the method of re-aligning onto the detector array further comprises the step of tilting the reference beam to re-align the holographic image onto the detector array such that when re-aligned, the incident angle of the reference beam on the medium, with respect to the third axis is intentionally tilted to be different from the third-axis-incident angle.

3. A method as recited in claim 2 wherein:

the holographic image includes a plurality of pixels;

the detector array includes a plurality of detector elements; and through tilting the reference beam, each pixel of the image is matched in position to each detector element.

4. A method as recited in claim 2 wherein though the medium's position has changed laterally, the holographic image is re-aligned onto the detector array through tilting the reference beam.

5. A method as recited in claim 4 wherein though the medium has changed its elevation, the holographic image is re-aligned onto the detector array through tilting the reference beam.

6. A method as recited in claim 5 wherein:

the holographic image includes a plurality of pixels;

the detector array includes a plurality of detector elements; and though the medium has changed its elevation, and the medium's position has changed laterally, through tilting the reference beam, each pixel of the image is matched in position to each detector element.

7. A method as recited in claim 6 wherein:

the hologram includes two pixels for tracking the alignment of the holographic image; and the method further comprises the step of measuring the image of the two pixels to determine the alignment of the holographic image.

8. A method as recited in claim 7 wherein the step of measuring the image of the two pixels includes the step of using two quadrant detectors so that if the holographic image is aligned, the image of each pixel resides at the center of one of the quadrant detectors.

9. A method as recited in claim 2 wherein the reference beam is a plane wave.

10. A method as recited in claim 2 wherein the reference beam is a spherical wave.

11. A method as recited in claim 2 wherein the step of tilting repeats based on a servomechanism receiving outputs from the detector array, to re-align the holographic image onto the detector array.

12. An apparatus for re-aligning onto a detector array a holographic image of a Fourier region hologram stored in a medium, the medium spinning around a first axis, the hologram being generated by a reference beam and a signal beam, in generating the hologram, the reference beam being incident on the medium with respect to a second axis at a second-axis-incident angle, such that the holographic image of the hologram when reproduced by the reference beam is aligned onto the detector array, the two axes being substantially orthogonal to each other, and the medium's orientation being modified through rotation with respect to the second axis so that the holographic image when reproduced by the reference beam is not aligned onto the detector array, the apparatus comprising a mechanical controller for tilting the reference beam to re-align the holographic image onto the detector array such that when re-aligned, the incident angle of the reference beam on the medium with respect to the second axis is intentionally tilted to be different from the second-axis-incident angle.

13. An apparatus as recited in claim 12 wherein:

in generating the hologram, the reference beam is incident on the medium with respect to a third axis at a third-axis-incident angle, such that the holographic image of the hologram when reproduced by the reference beam is aligned onto the detector array, the three axes are substantially orthogonal to each other, the medium's orientation has been modified through rotation with respect to the third axis, the controller also tilts the reference beam to re-align the holographic image onto the detector array such that when re-aligned, the incident angle of the reference beam on the medium, with respect to the third axis is intentionally tilted to be different from the third-axis-incident angle.

14. An apparatus as recited in claim 13 wherein:

the hologram includes two pixels for tracking the alignment of the holographic image; and the apparatus further comprises a detector array for tracking the positions of the two pixels to determine the alignment of the hologram.

15. An apparatus as recited in claim 14 wherein the detector array includes two quadrant detector elements for determining the positions of the two pixels for tracking the alignment of the holographic image so that if the holographic image is aligned, the image of each pixel resides at the center of one of the quadrant detectors.

16. An apparatus as recited in claim 13 further comprising a servomechanism to repeatedly tilt the reference beam based on outputs from the detector array to re-align the holographic image onto the detector array.

17. An apparatus as recited in claim 12 wherein the reference beam is a plane wave.

18. An apparatus as recited in claim 12 wherein the reference beam is a spherical wave.

* * * * *